(No Model.)

P. M. DICE.
LAND MARKER.

No. 332,792. Patented Dec. 22, 1885.

WITNESSES
T. W. Fowler
H. B. Applewhaite

INVENTOR
Peter M. Dice,
by A. H. Evans & Co.
Attorneys

UNITED STATES PATENT OFFICE.

PETER M. DICE, OF NORTH MANCHESTER, INDIANA, ASSIGNOR OF ONE-HALF TO ELI H. BUTTERBAUGH, OF SAME PLACE.

LAND-MARKER.

SPECIFICATION forming part of Letters Patent No. 332,792, dated December 22, 1885.

Application filed August 5, 1885. Serial No. 173,636. (No model.)

*To all whom it may concern:*

Be it known that I, PETER M. DICE, a citizen of the United States, residing at North Manchester, in the county of Wabash, in the State of Indiana, have invented a new and useful Improvement in Land-Markers, of which the following is a full, clear, and exact description, reference being had to the accompanying drawings, making part of this specification, in which—

Figure 1:
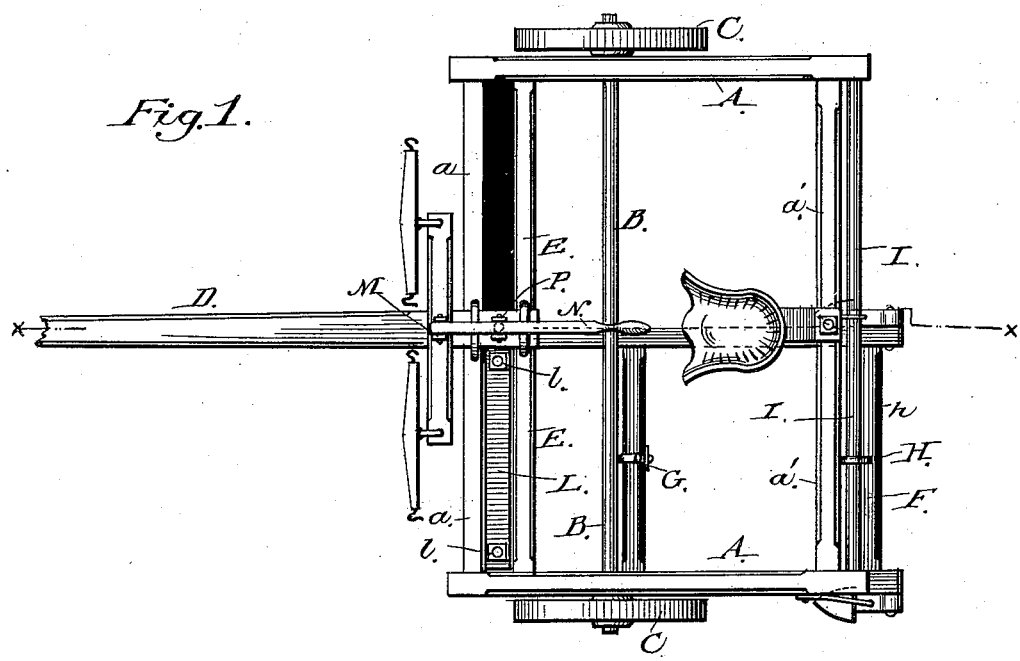
Figure 2:
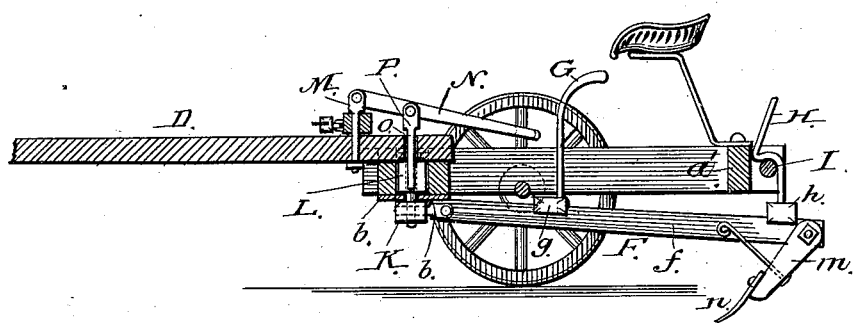

Figure 1 is a plan view of a land-marker embodying my improvements. Fig. 2 is a sectional view on the line $x$ $x$ of Fig. 1, and showing the supplemental frame moved to the opposite side of the main frame.

My invention relates to devices for marking land; and the same consists, essentially, in a frame mounted upon wheels; in a supplemental frame carrying the marking points or shovels and hinged to the main frame, so as to have a sliding movement thereon; in a locking device attached to the main frame, whereby the supplemental frame is securely held to its position on either side of the frame, and also in the peculiar construction and combination of devices, which I shall hereinafter fully describe and claim.

To enable others skilled in the art to make and use my invention, I will now proceed to describe the manner in which I have carried it out.

In the said drawings, A represents a frame composed of suitable timbers mounted upon an axle, B, and supported by the wheels C. Upon the forward part of the frame is mounted the pole or tongue D, to which is secured the usual single and double trees. A beam, E, passes transversely across the frame, slightly in the rear of the front beam, $a$, the space between these two beams forming a guide for a sliding supplemental frame, to be hereinafter described. The bottom portions of both the beams $a$ and E are faced with metallic plates $b$, which project inwardly beyond the inner sides of the beams, thereby forming a slot in which moves the front portion of the supplemental frame. The rear beam, $a'$, of the main frame is provided with a seat for the operator.

The supplemental frame F consists, essentially, of the longitudinal beams $f$ and the transverse beams $g$ and $h$. On the beam $g$ is secured a handle, G, and on the beam $h$ a catch, H, whereby the driver, by raising the handle, lifts the supplemental frame from the ground. The catch H, engaging a transversely-placed rod, I, securely holds the frame, with its marking-points, out of the ground until the operator desires to proceed with his marking. The supplemental frame is hinged to a transverse bar, K, and this bar is in turn bolted to a similarly-placed bar, L, which is located within the space formed by the beams $a$ and E. The bolts $l$, which securely hold the bars K and L, engage the slot formed by the plates $b$, and permit the frame to be moved laterally from one side of the main frame to the other, this movement being readily accomplished by the operator pressing against the side of the handle G, before described. The supplemental frame is also provided at its rear with shovel-beams $m$, carrying the markers or shovels $n$, one of which travels and marks the ground immediately in the path of one of the supporting-wheels. The supplemental frame is preferably of a width about equal to one-half the width of the main frame, and makes two furrows or marks—one in line with the supporting-wheel next to the frame, and the other in line with or near the longitudinal center of the main frame. From this construction it is evident that when the team has reached the end of the field and the machine turned, by simply releasing a locking mechanism the supplemental frame may be readily moved to the opposite side of the machine. When this is done, and the team started on the return, it will be found one of the main wheels will travel in the furrow previously made by the inner shovel of the frame, while the shovels or markers will make two furrows or guides, one of which will again be used as a guide for one of the wheels. Therefore during each drive across the field two independent furrows are made each time by shifting the supplemental frame from one side to the other. When the frame F has been moved in either position, right or left, it is necessary that some means be provided for retaining it in the desired position. To accomplish this, I attach to the tongue or pole or to the whiffletree a stud, M, having a bifurcated end in which is pivotally secured a lever, N. In the rear portion of the tongue and immediately over the space between the beams $a$ and E is formed a hole, O, and on the lever N is hung a swinging bolt, P, adapted, when the lever is depressed, to engage the hole O, and, passing into the space before mentioned, bears against the end of the bar L, and securely holds the supplemental frame, in whichever position it may be placed.

I am thus enabled to construct a cheap substantial marker, and one that does a greater amount of work in a given time than most of the markers now in general use.

Having thus described my invention, what I claim as new, and desire to secure by Letters Patent, is—

1. In a land-marker, a main frame supported upon wheels, in combination with a supplemental frame beneath and hinged to the main frame and adapted to have a lateral movement therein, said supplemental frame being of a width about equal to one-half the width of the main frame and hinged to laterally-moving bars in the front of said frame, substantially as and for the purpose set forth.

2. The main frame provided with the spaced bars $a$ and E, the metallic plates $b$, and the transverse rod I, in combination with a supplemental frame carrying the markers or shovels, and provided with the handle H and catch G, and the bars K and L, bolted together and moving in the slot between the beams $a$ and E, substantially as described.

3. The main frame provided with the spaced bars, the laterally-moving bars K and L, and the supplemental frame hinged thereto, in combination with a locking-bolt adapted to bear against the ends of the sliding bars, substantially as described.

4. The main frame and the laterally-moving supplemental frame, in combination with a stud, M, a lever, N, and a swinging bolt adapted to lock the supplemental frame, substantially as described.

PETER M. DICE.

Witnesses:
ISRAEL PENROD,
ELI H. BUTTERBAUGH.